US012767245B2

(12) United States Patent
Multari et al.

(10) Patent No.: US 12,767,245 B2
(45) Date of Patent: Oct. 20, 2026

(54) MOBILE SPOILER ASSEMBLY FOR A ROAD VEHICLE, METHOD OF CONTROLLING A MOBILE SPOILER FOR A ROAD VEHICLE AND RELATED ROAD VEHICLE

(71) Applicant: FERRARI S.P.A., Modena (IT)

(72) Inventors: Daniele Multari, Modena (IT); Alessandro Calamita, Modena (IT)

(73) Assignee: FERRARI S.P.A., Modena (IT)

( * ) Notice: Subject to any disclaimer, the term of this patent is extended or adjusted under 35 U.S.C. 154(b) by 559 days.

(21) Appl. No.: 18/354,691

(22) Filed: Jul. 19, 2023

(65) Prior Publication Data

US 2024/0025493 A1 Jan. 25, 2024

(30) Foreign Application Priority Data

Jul. 20, 2022 (IT) ........................ 102022000015267

(51) Int. Cl.
*B62D 35/00* (2006.01)
*H02K 7/14* (2006.01)

(52) U.S. Cl.
CPC ............. *B62D 35/007* (2013.01); *H02K 7/14* (2013.01)

(58) Field of Classification Search
CPC ....... B62D 35/007; B62D 35/00; B62D 37/02
USPC ........................................... 296/180.1, 180.5
See application file for complete search history.

(56) References Cited

U.S. PATENT DOCUMENTS 6,575,522 B2 * 6/2003 Borghi .................... B62D 37/02 296/180.5
7,578,543 B2 * 8/2009 Wegener ................ B62D 35/00 296/180.5
7,780,223 B2 * 8/2010 Kottenstette ........... B62D 35/02 296/180.1

(Continued)

FOREIGN PATENT DOCUMENTS

DE 202020100936 U1 2/2021
WO 2010030158 A1 3/2010

OTHER PUBLICATIONS

Italian Search Report for Application No. 102022000015267, Filing Date: Jul. 20, 2022; Date of Mailing: Mar. 2, 2023, 10 pages.

(Continued)

*Primary Examiner* — Carly W. Lynch
(74) *Attorney, Agent, or Firm* — CANTOR COLBURN LLP

(57) ABSTRACT

Movable spoiler assembly for a road vehicle comprising: a movable spoiler configured to be movably attached to a body of the road vehicle and capable of being moved between a retracted position and an extracted position; and an actuation system configured to control the movable spoiler between the retracted position and the extracted position; the actuation system comprises at least two actuators to move the movable spoiler and at least two transmission elements to operatively couple each actuator to the movable spoiler; the two actuators comprise a first actuator configured to command at least the displacement of the movable spoiler between the retracted position and the extracted position, and a second actuator configured to command at least a tilt of the movable spoiler around the longitudinal axis, so as to vary an angle of incidence of the leading edge of the spoiler.

15 Claims, 13 Drawing Sheets

(56) References Cited

U.S. PATENT DOCUMENTS

| | | | | |
|---|---|---|---|---|
| 2019/0054962 | A1* | 2/2019 | Potvin | B62D 35/007 |
| 2019/0210711 | A1* | 7/2019 | Lorenz | B64C 9/18 |
| 2020/0283078 | A1 | 9/2020 | Czapka | |
| 2021/0086846 | A1* | 3/2021 | Duong | B60R 16/0231 |
| 2021/0139087 | A1* | 5/2021 | Promutico | B62D 37/02 |

OTHER PUBLICATIONS

Extended European Search Report of European Patent Application No. 23186331.7, Date of Mailing Dec. 11, 2023, 21 pages.

* cited by examiner

MOBILE SPOILER ASSEMBLY FOR A ROAD VEHICLE, METHOD OF CONTROLLING A MOBILE SPOILER FOR A ROAD VEHICLE AND RELATED ROAD VEHICLE

CROSS-REFERENCE TO RELATED APPLICATIONS

This patent application claims priority from Italian patent application no. 102022000015267 filed on Jul. 20, 2022, the entire disclosure of which is incorporated herein by reference.

TECHNICAL FIELD

The present invention relates to a movable spoiler assembly for a road vehicle, a method of controlling a movable spoiler for a road vehicle, and a related road vehicle.

In particular, the present description will refer, without thereby losing generality, to a movable spoiler assembly comprising a rear movable spoiler of a road vehicle, i.e. a movable spoiler attached to a rear part of the body of the road vehicle, relative to a forward motion direction of the road vehicle.

More specifically, the present invention can be advantageously, but not exclusively, applied, in a movable spoiler assembly for high-performance road vehicles, to which the following description will make explicit reference without thereby losing generality.

BACKGROUND OF THE INVENTION

As is known, a road vehicle, whether it is of a sports (i.e. high-performance) type or not, includes a body, which in turn comprises a chassis, which defines an inner, non-visible part of the road vehicle, and a bodywork, which comprises the outermost parts of the road vehicle and thus defines an outer part of the road vehicle visible to users.

The bodywork typically includes the sides, the roof, the doors, the fenders, the hoods, and similar parts.

The bodywork also includes spoilers or wings, i.e. aerodynamic elements usually protruding from the rest of the bodywork and capable of generating a downward thrust on the road vehicle in order to increase its road grip.

In the present description, the terms “spoiler” and “wing” are to be considered interchangeable.

Typically, a road vehicle of a sports type includes at least one rear spoiler, i.e. attached to a rear part of the body of the road vehicle, relative to a forward motion direction of the road vehicle.

In some cases, road vehicles additionally include a front spoiler, i.e. attached to a front part of the body of the road vehicle.

The physical principle behind the operation of an automotive spoiler or wing is exactly the same that allows aircraft to fly, but unlike in aeronautical industry, it is used in the opposite way: instead of supporting the vehicle in the air, it pushes it more towards the ground to create a so-called “downforce”, instead of a lift as with aircraft.

In practice, the spoiler defines an airfoil element which, as of a certain speed, generates lift towards the ground on which the road vehicle is travelling.

It is known that spoilers are particularly useful at high speeds, or rather at speeds above a certain threshold, as of which they allow effectively improving the aerodynamic performance of the road vehicle and, thus, progressively increasing its road grip, improving driving stability, and reducing consumption.

For this purpose, retractable (or extractable) wings or spoilers are known in the industry, which are movable between a retracted position within (i.e. integrated in) the bodywork, and a position extracted from the bodywork.

The retracted position defines a resting position of the spoiler, while the extracted position defines a working or operating position of the spoiler.

In practice, movable spoilers mounted on road vehicles are known.

According to a known configuration, the movable spoiler is moved from the retracted position to the extracted position when a certain forward speed of the road vehicle is reached.

According to another configuration, the movable spoiler is moved from the retracted position to the extracted position as a result of a command of the user (for example, as a result of the selection of a sports driving mode).

Therefore, a movable spoiler of the type described above performs the dual function of:

- providing an increase in aerodynamic performance only when needed, while reducing aerodynamic obstacles at low speeds or during a normal driving mode; and
- avoiding, when not in use, altering the stylistic profile defined by the bodywork of the road vehicle.

In the light of the foregoing, a road vehicle of the type described above comprises a movable spoiler assembly including the movable spoiler and a system for moving the movable spoiler between the retracted position and the extracted position.

Typically, the actuation system includes a hydraulic or oleo-hydraulic or pneumatic actuator, which allows both controlling the movable spoiler while using a relatively low power, and easily supporting the aerodynamic load exerted on the movable spoiler in an extracted position during the forward motion of the road vehicle at high speeds.

Although movable spoiler assemblies of the type described above are structurally and functionally sound, the Applicant has found that they are susceptible to further improvement, in particular with regard to an adaptation of the movable spoiler to different driving conditions and a simplification of the implementation of the actuation system.

DESCRIPTION OF THE INVENTION

The object of the present invention is to provide a movable spoiler assembly for a road vehicle, a method of controlling a movable spoiler, and a related road vehicle that at least partially satisfy the aforementioned requirement and, at the same time, are simple and inexpensive to manufacture.

According to the present invention, a movable spoiler assembly for a road vehicle, a method of controlling a movable spoiler and a related road vehicle are provided as claimed in the following independent claims and, preferably, in any of the claims directly or indirectly dependent on the independent claims.

The claims describe preferred embodiments of the present invention and constitute an integral part of the present description.

BRIEF DESCRIPTION OF THE DRAWINGS

For a better understanding of the present invention, some preferred non-limiting embodiments are described in the following, by way of mere example and with the aid of the accompanying drawings, wherein.

EMBODIMENTS OF THE INVENTION

Figure 1:
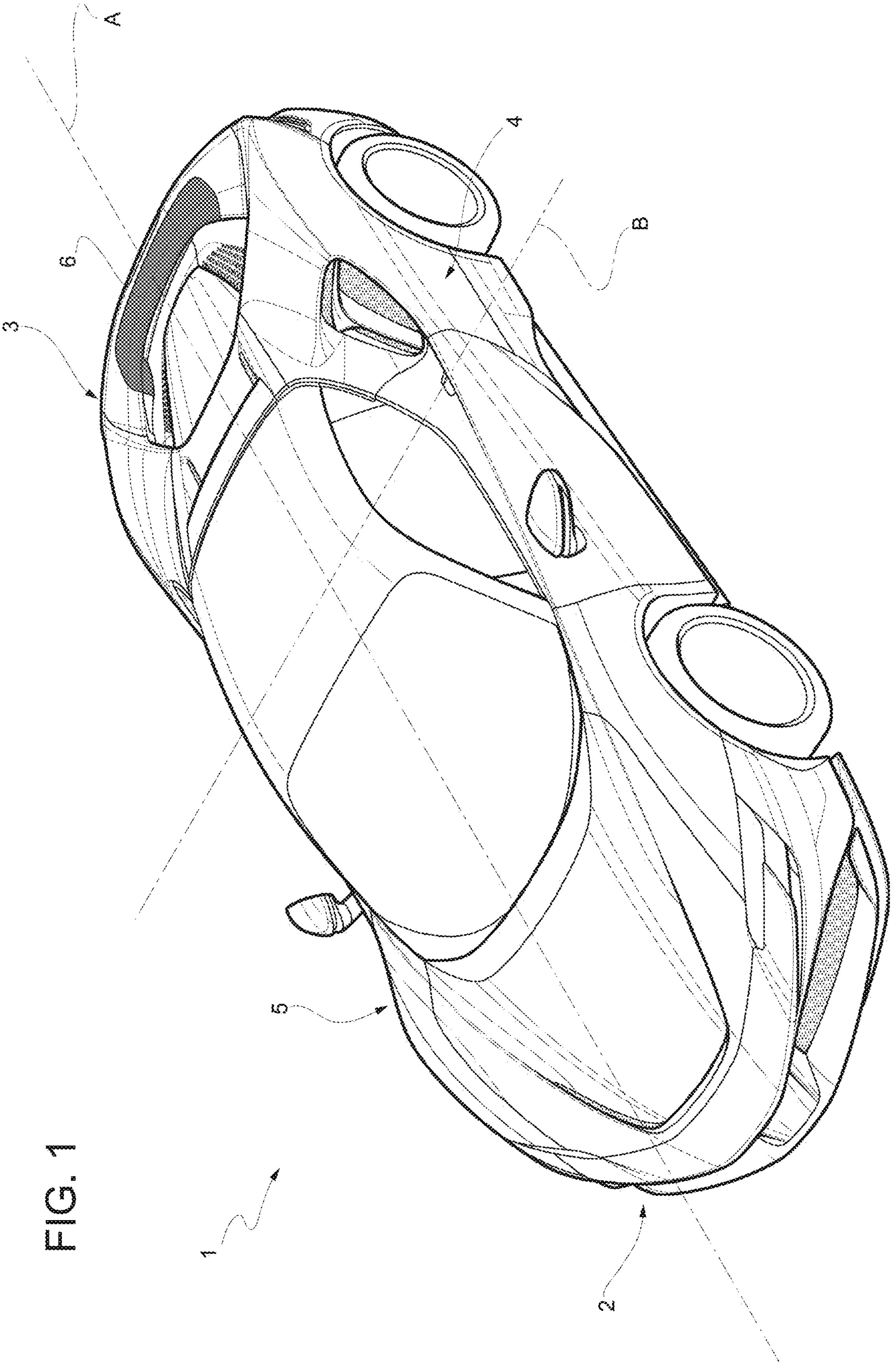
FIG. 1 is a perspective view of a road vehicle comprising a movable spoiler assembly provided according to the present invention.
Figure 2:
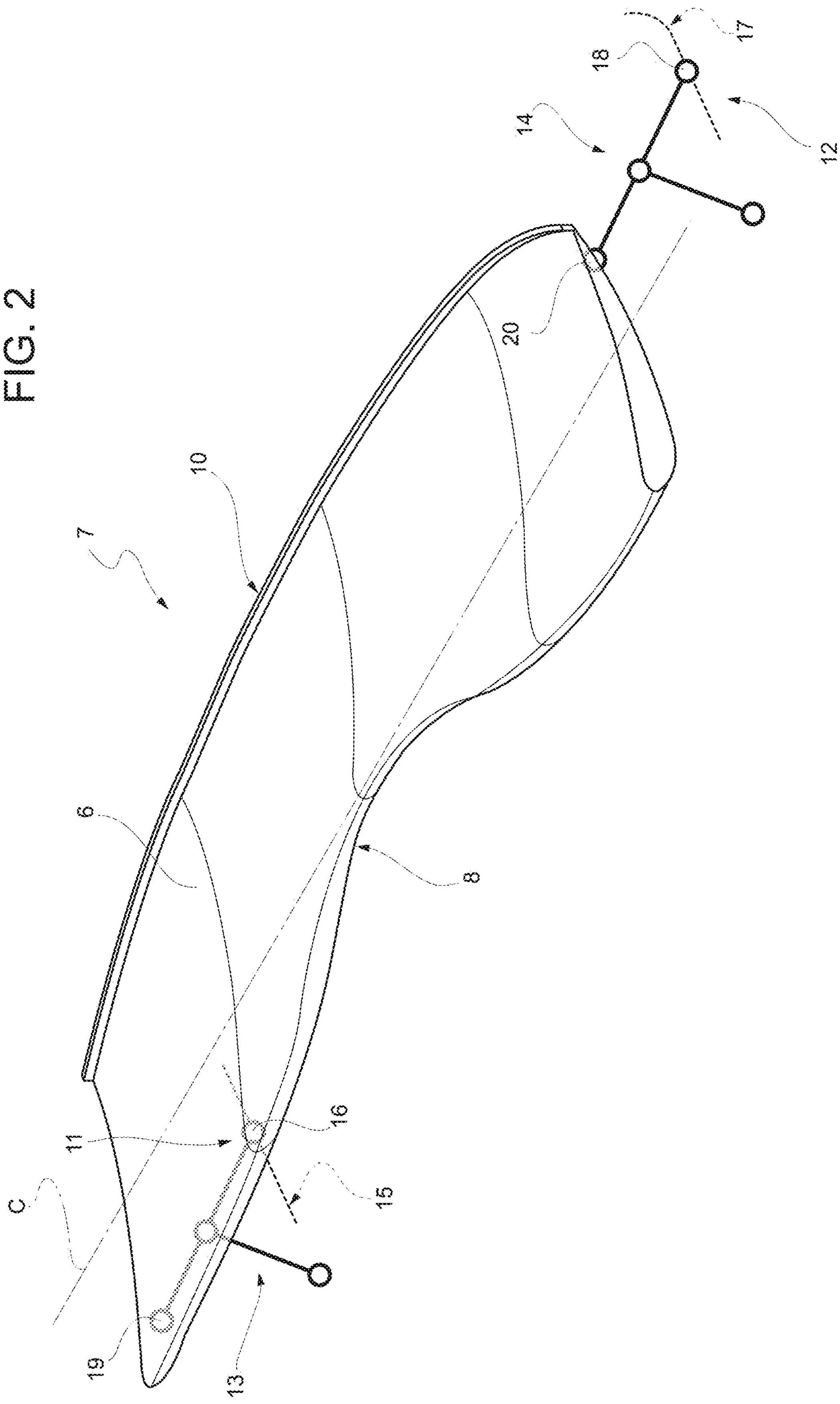
FIG. 2 is a perspective view, on an enlarged scale and with parts removed for clarity, of the movable spoiler assembly of the road vehicle of FIG. 1.

With reference to FIG. 1, the reference number 1 indicates, as a whole, a road vehicle, in particular a road vehicle of a sports, i.e. high-performance type.

The road vehicle 1 has a front part 2 and a rear part 3, relative to a forward motion direction of the vehicle.

In addition, the road vehicle 1 comprises a chassis (known per se and not illustrated), which defines an interior, non-visible part of the road vehicle, and a bodywork 4, which comprises the outermost parts of the road vehicle 1 and thus defines an outer part of the vehicle visible to users.

In detail, the bodywork 4 includes the sides, the roof, the doors, the fenders, the hoods, and similar parts.

In practice, the road vehicle 1 includes a vehicle body 5 defined by the chassis and the bodywork 4.

In particular, the body 5 defines a longitudinal axis A of the road vehicle 1 along its length and a transverse axis B of the road vehicle 1 along its width.

The aforementioned forward motion direction of the road vehicle 1 is preferably parallel to the longitudinal axis A and transverse, in particular orthogonal, to the longitudinal axis B.

The bodywork 4 can also include spoilers (also known as "wings"), i.e. aerodynamic elements usually protruding from the rest of the bodywork 4 and capable of generating a downward thrust on the road vehicle in order to increase its road grip.

In practice, the spoiler 6 defines an airfoil element which, as of a certain speed, generates lift towards the ground on which the road vehicle 1 is travelling (i.e. downforce).

In the particular case illustrated, the bodywork 4 of the road vehicle 1 comprises at least one rear spoiler 6, i.e. mounted on the body 5 at the rear part 3 of the road vehicle 1.

Alternatively, the spoiler 6 could be mounted on the body 5 at the front part 2 of the road vehicle 1, for example near the ground on the centreline of the front part 2.

The present description refers to a rear spoiler 6, without thereby losing generality.

The spoiler 6 is configured to be movably attached to the body 5.

In detail, the spoiler 6 is capable of being moved, in a mounted condition on the body 5, at least between:

- a retracted position (FIG. 1), wherein it is arranged in a position proximal to the body 5; and
- an extracted position, wherein it is arranged in a position distal to the body 5.

More specifically, not limitatively, the retracted position defines a resting condition of the spoiler 6, whereby the spoiler 6 is integrated in the profile of the bodywork 4, i.e. it is flush with the bodywork 4, without protruding from the same.

Conversely, the extracted position defines an operating condition of the spoiler 6, whereby the spoiler 6 protrudes from the profile of the bodywork 4.

In the light of the foregoing, the spoiler 6 defines a movable spoiler of the road vehicle 1.

In one embodiment, the movable spoiler 6 can be moved from the retracted position to the extracted position by reaching or exceeding a certain forward speed of the road vehicle 1.

In an alternative embodiment, the movable spoiler 6 is moved from the retracted position to the extracted position as the result of a specific command of the user, for example following the selection of a sports driving mode.

In other words, the movable spoiler 6 is configured to switch from the retracted position to the extracted position and vice versa during a driving operation of the road vehicle 1.

As shown in FIGS. 2 to 13, the movable spoiler 6 defines an airfoil element having a longitudinal axis C and including a leading edge 8 and a trailing edge 10 extending substantially along an axial (parallel) direction relative to the axis C.

In particular, the movable spoiler 6 extends from the leading edge 8 to the trailing edge 10 along an axis E transverse, specifically perpendicular, to the axis C.

The movable spoiler 6 is part of a movable spoiler assembly 7 for the road vehicle 1.

In particular, the movable spoiler assembly 7 is mounted on the body 5 (at the rear part 3 of the road vehicle 1) so that:

- the axis C is transverse to the axis A (and substantially parallel to the axis B); and
- the leading edge 8 and the trailing edge 10 are transverse to the axis A.

The movable spoiler assembly 7 further comprises an actuation system of the movable spoiler 6 configured to control the movable spoiler 6 between the retracted position and the extracted position.

Specifically, the actuation system comprises at least two actuators 11, 12 to move the movable spoiler 6 and at least two transmission elements 13, 14 to operatively couple each actuator 11, 12 to the movable spoiler 6, respectively.

According to an aspect of the invention, the two actuators comprise:

- a first actuator 11 configured to command at least the displacement of the movable spoiler 6 between the retracted position and the extracted position; and
- a second actuator 12 configured to command at least a tilt of the movable spoiler 6 with respect to the axis C, so as to vary an angle of incidence of the leading edge 8 defined, in the aforementioned mounted condition, relative to a forward motion direction of the road vehicle 1.

Advantageously but not limitatively, the first actuator 11 and the second actuator 12 are mechanically connected to each other exclusively through the movable spoiler 6.

According to the preferred embodiment illustrated in FIGS. 2 to 5 and FIGS. 10 to 13, the first actuator 11 is of a linear type and comprises a guide element 15 having a straight section 15*a* and a slide element 16 slidable on the straight section 15*a* to command the movement of the movable spoiler 6 between the retracted position and extracted position.

According to these embodiments, the second actuator 12 is also of a linear type and comprises a guide element 17 having a straight section 17*a* and a slide element 18 slidable on the straight section 17*a*.

In particular, the guide element 15 and the guide element 17 are (substantially) parallel to the normal direction of travel of road vehicle 1.

In particular, the straight section 15*a* and the straight section 17*a* are parallel to each other.

Preferably but not limitatively, the guide element 17 is at least as long as the guide element 15. In particular, the straight section 17*a* is at least as long as the straight section 15*a*.

In use, the slide element 16 and the slide element 18 are simultaneously slidable along the respective straight sections 15*a*, 17*a* to command the movement of the movable spoiler 6 between the retracted position and the extracted position.

Figure 3:
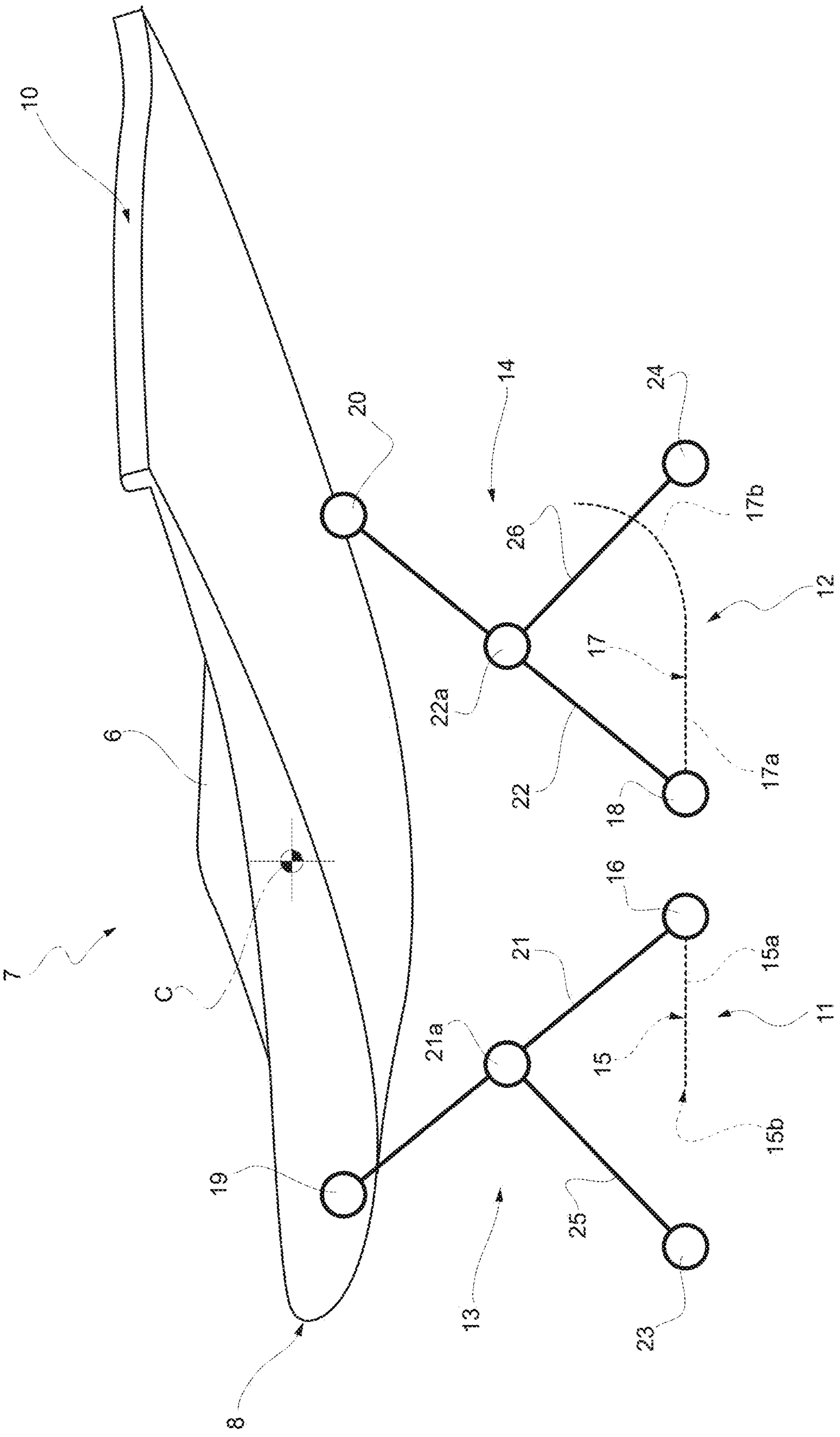
FIGS. 3 to 5 are schematic side views, partially sectioned, on an enlarged scale and with parts removed for clarity, of the movable spoiler assembly of FIG. 2 during three distinct operating conditions.
Figure 4:
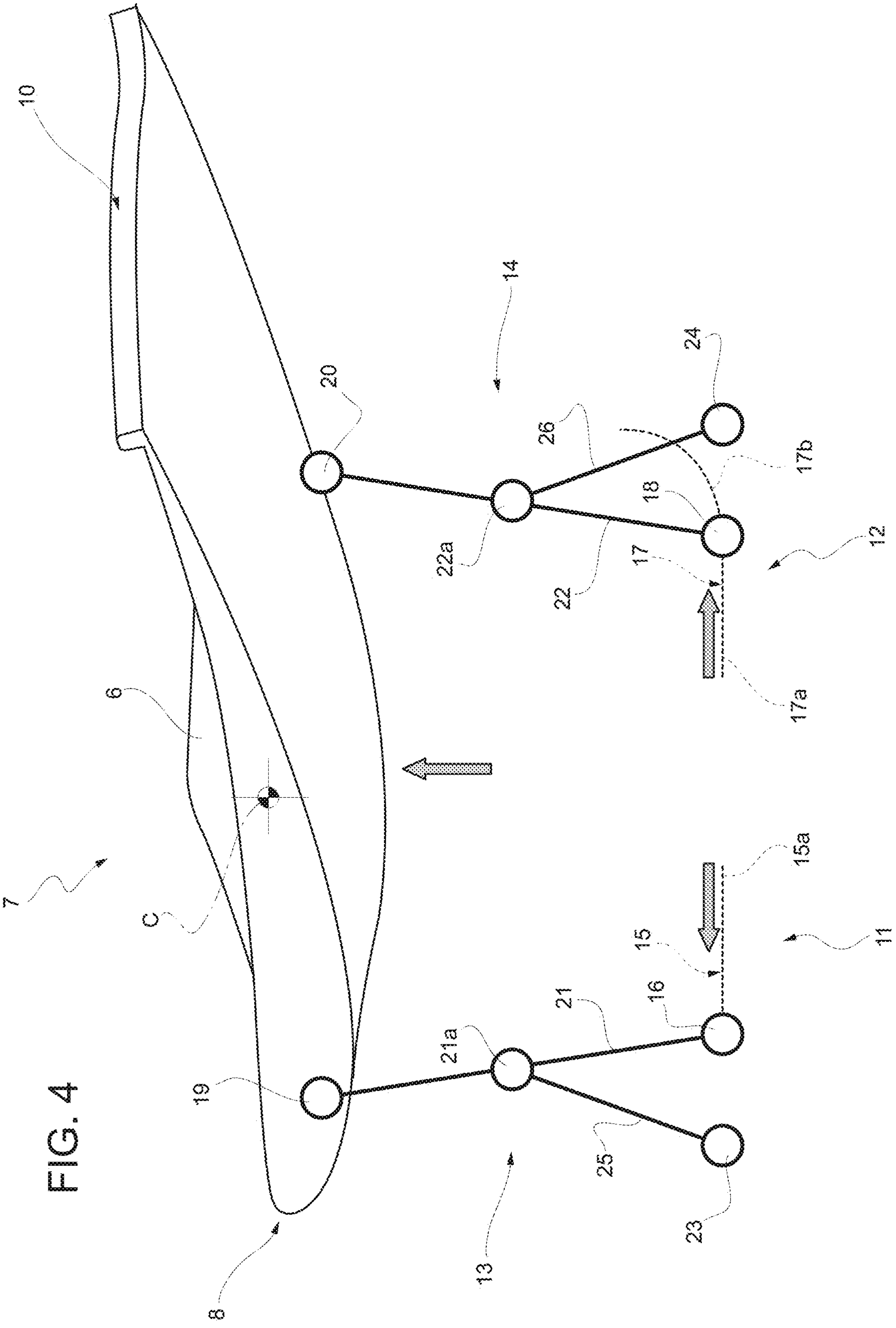
Figure 5:
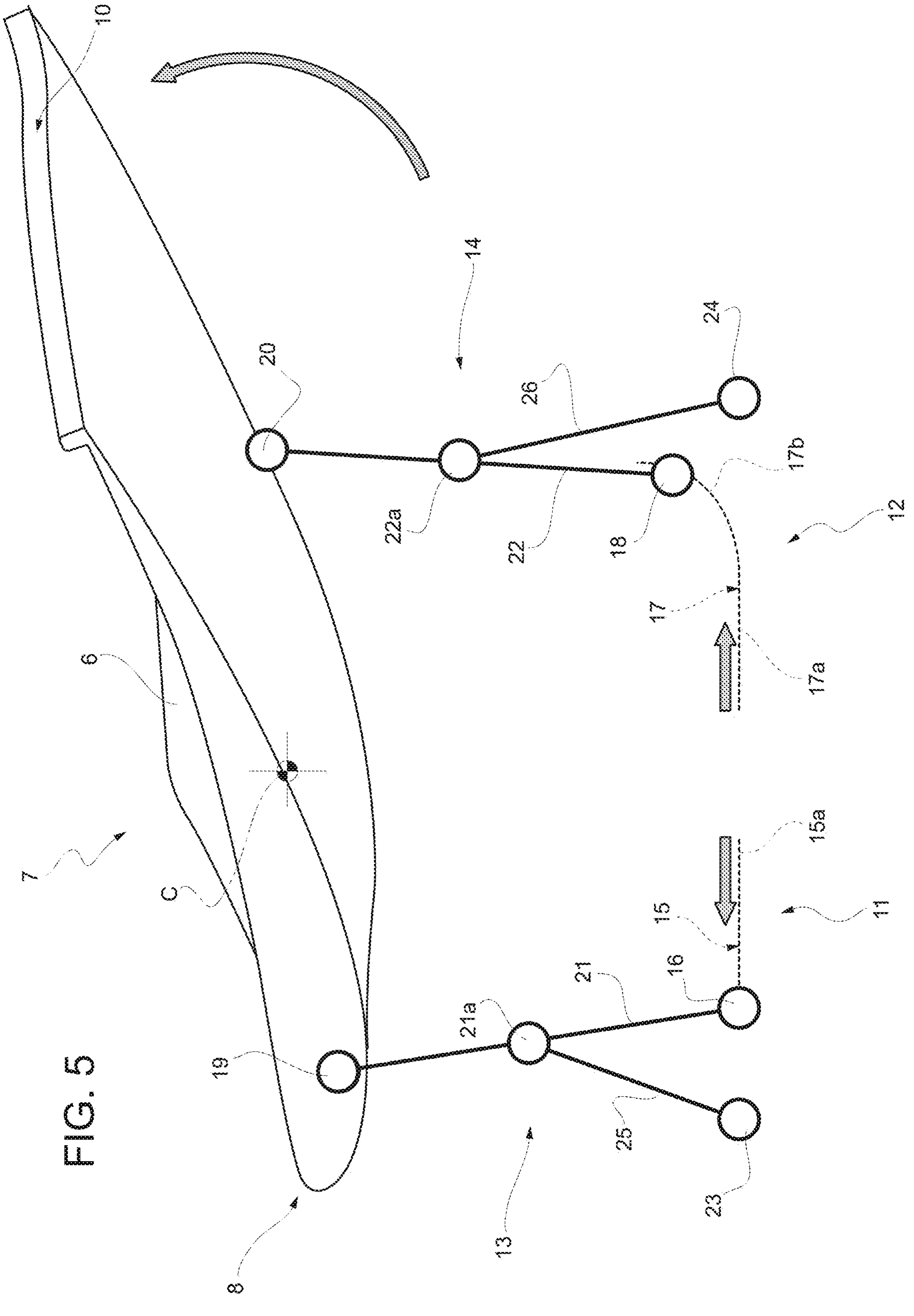
Figure 11:
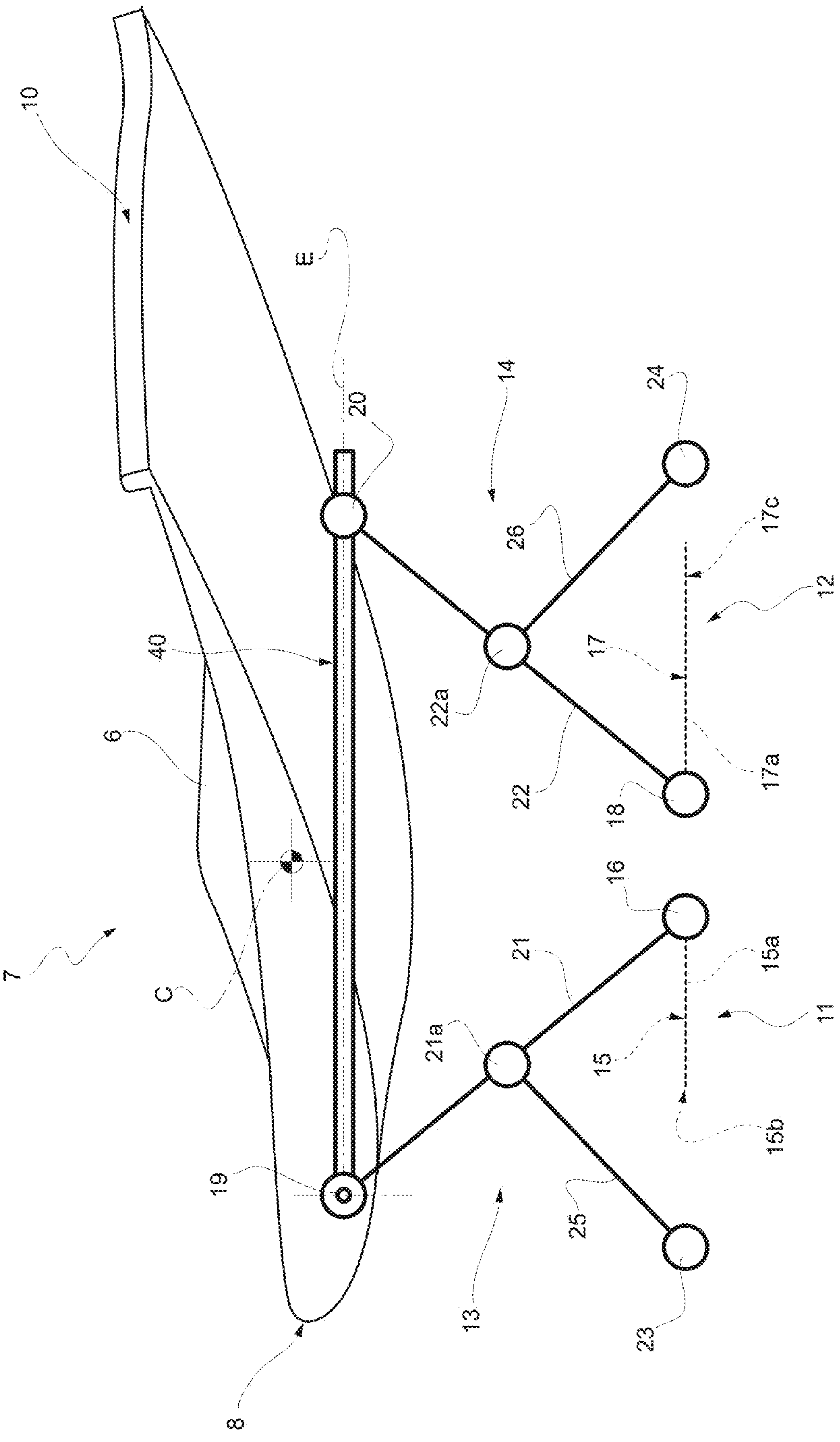
FIGS. 11 to 13 are schematic side views, partially sectioned, on an enlarged scale and with parts removed for clarity, of the movable spoiler assembly of FIG. 10 during three distinct operating conditions.
Figure 12:
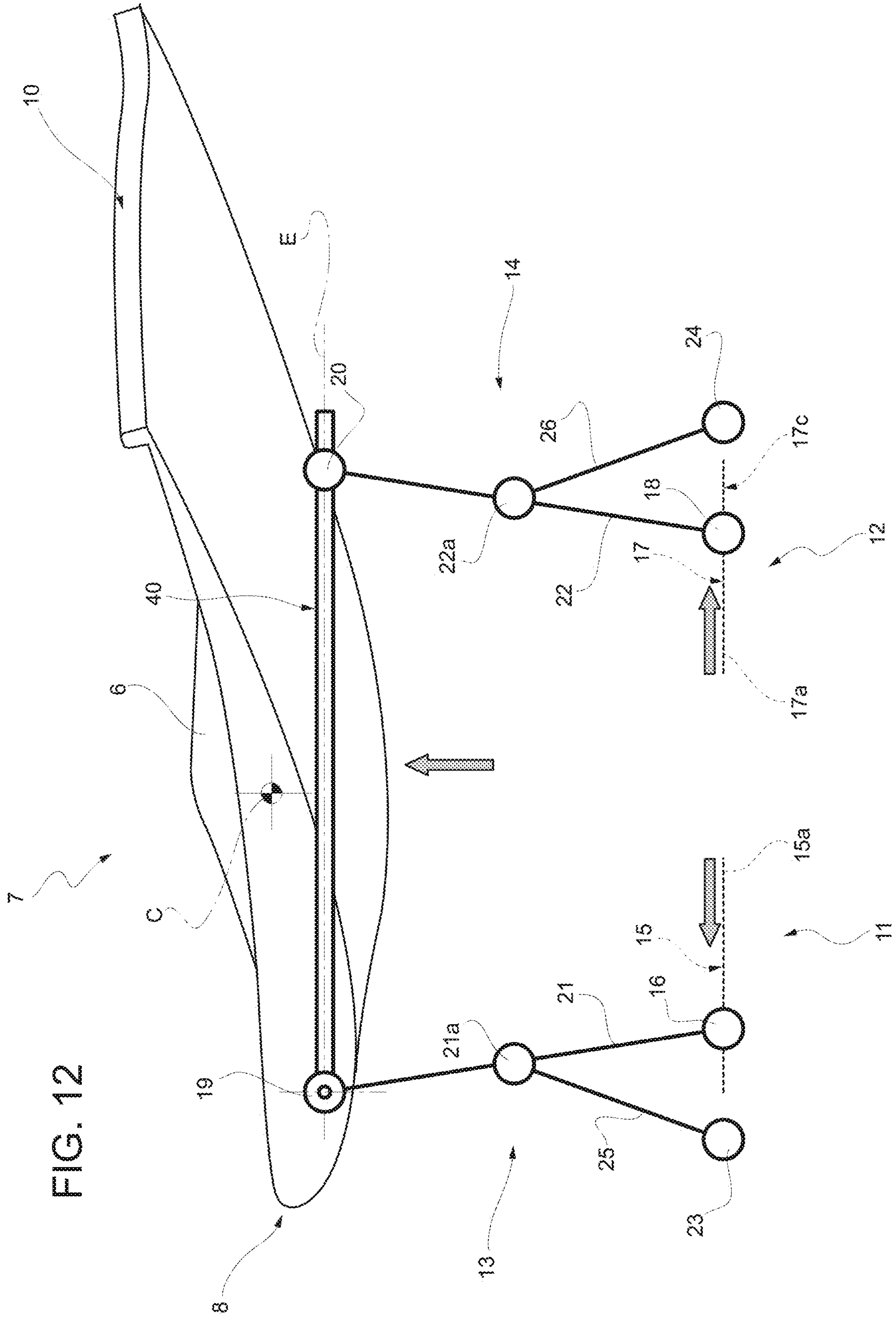
Figure 13:
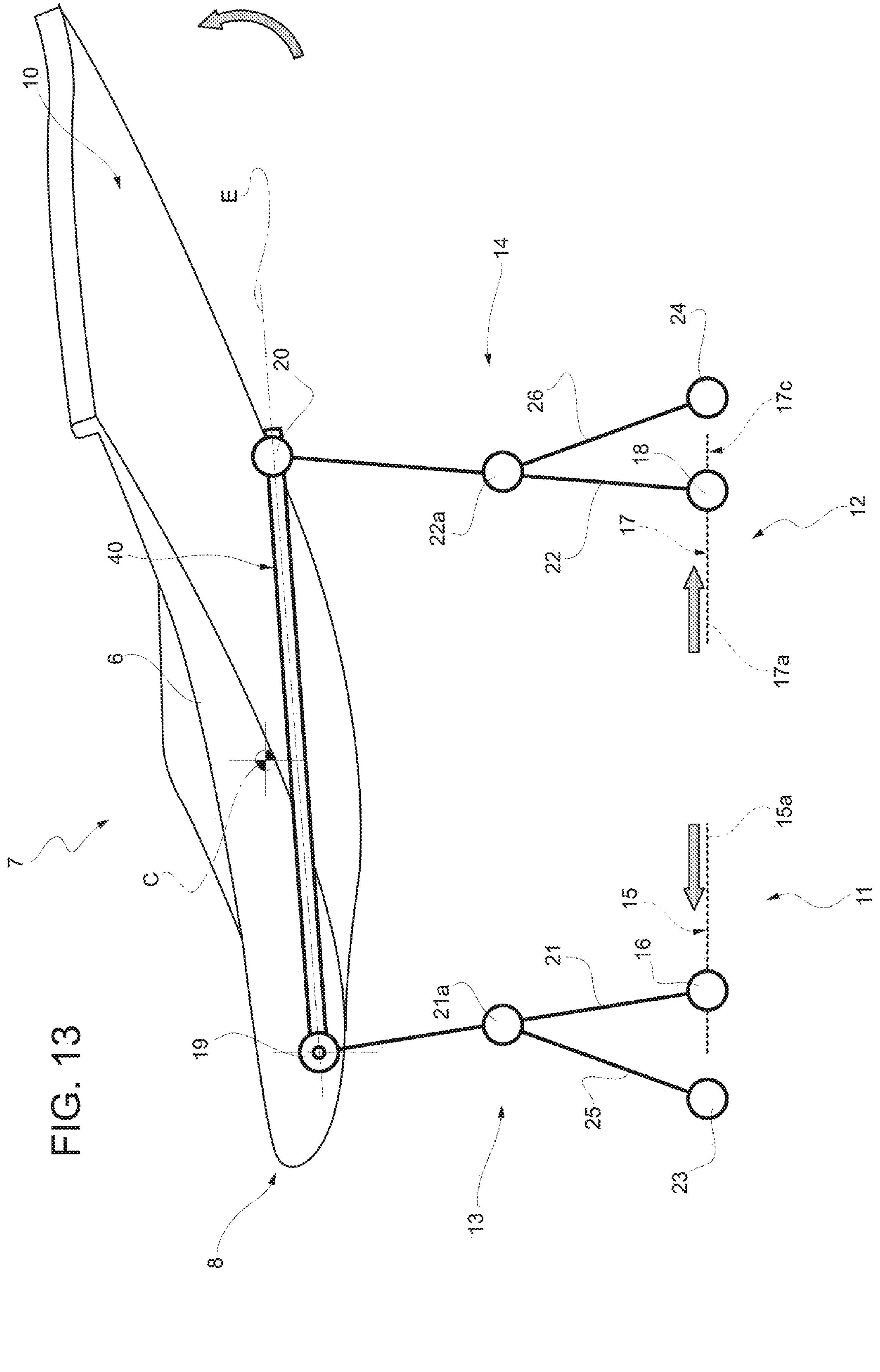

This is shown in FIGS. 3 and 4 and FIGS. 11 and 12: FIGS. 3 and 11 represent the movable spoiler 6 in the retracted position; FIGS. 4 and 12 represent the movable spoiler 6 in the extracted position, following a simultaneous sliding of the slide element 16 on the straight section 15*a* and of the slide element 18 on the straight section 17*a*.

The two transmission elements 13, 14 comprise:

- a first transmission element 13 connecting the first actuator 11 to the movable spoiler 6 at a first hinge or fulcrum 19 arranged near one of either the leading edge 8 or the trailing edge 10, in particular at the leading edge 8, and
- a second transmission element 14 connecting the second actuator 12 to the movable spoiler 6 at a second hinge or fulcrum 20 arranged at the other between the leading edge 8 and the trailing edge 10, in particular at the trailing edge 10.

The embodiments described in the present document allow reducing the depth dimensions of the actuation system of the movable spoiler 6, which enables an articulated movement without excessively encumbering the interior of the bodywork of the road vehicle 1.

In the non-limiting embodiment of FIGS. 10 to 13, the second hinge or fulcrum 20 is mounted so as to be slidable on a (preferably, but not limitatively, linear) guide 40 provided at the movable spoiler 6. More precisely, therefore, in such embodiments, the second actuator 12 defines a so-called slotted link mechanism.

In particular, the guide 40 is arranged along the transverse axis E of the movable spoiler 6. In particular, the second hinge or fulcrum 20 comprises a roller which is coupled by means of form coupling to the guide 40 arranged along the transverse axis E of the movable spoiler 6. In particular, the axis E extends substantially parallel to the normal direction of travel of the road vehicle 1. More precisely, the axis E is provided within the movable spoiler 6, running along its airfoil element substantially from the leading edge towards the trailing edge.

Alternatively, the hinge 19 could be arranged at the trailing edge 10 and the hinge 20 could be arranged at the leading edge 8.

In practice, the hinge 19 and the hinge 20 are conveniently arranged on opposite sides of the axis C, relative to a direction transverse to the axis C (thus parallel to the axis D).

In the particular case illustrated, the first transmission element 13 comprises a first arm 21 connecting the slide element 16 with the hinge 19; similarly, the second transmission element 14 comprises a first arm 22 connecting the slide element 18 with the hinge 20.

According to the invention, the first actuator 11 is configured to hold the hinge 19 in a fixed position, and the second actuator 12 is configured to command a rotation (possibly combined with a translation along the guide 40) of the hinge 20 around the hinge 19 held in a fixed position, so as to determine the aforementioned tilt of the movable spoiler 6 and the aforementioned variation of the angle of incidence.

According to the embodiments illustrated in FIGS. 2 to 5, the guide element 17 further comprises a curved section 17*b* extending from the straight section 17*a*. The slide element 18 is slidable on the curved section 17*b* to command the aforementioned rotation of the hinge 20 around the hinge 19 and to vary, in this manner, said angle of incidence.

More precisely, the second actuator 12 is selectively operable to command the sliding of the slide element 18:

- on the straight section 17*a*, simultaneously with the sliding of the slide element 16 on the respective straight section 15*a*, to simultaneously move the arms 21, 22, thereby determining the movement of the movable spoiler 6 between the retracted position and the extracted position; or
- on the curved section 17*b*, in a deferred manner with respect to the sliding of the slide element 16 on the straight section 15*a*, to move only the arm 22, thereby determining said rotation of the hinge 20 around the hinge 19 and varying said angle of incidence.

Otherwise, according to the embodiments illustrated in FIGS. 10 to 13, the guide element 17 further comprises a straight section 17*c* extending from the straight section 17*a* and prolonging it. The slide element 18 is slidable on the straight section 17*c* to command a relative movement of the hinge 20 with respect to hinge 19 along the guide 40, thus determining a variation in elevation between the hinge 20 and the hinge 19 and therefore the aforementioned rotation of the hinge 20 around the hinge 19, which allows adjusting the aforementioned angle of incidence even in this manner.

More precisely, the second actuator 12 is selectively operable to command the sliding of the slide element 18:

- on the straight section 17*a*, simultaneously with the sliding of the slide element 16 on the respective straight section 15*a*, to simultaneously move the arms 21, 22, thereby determining the movement of the movable spoiler 6 between the retracted position and the extracted position; or
- on the straight section 17*c*, in a deferred manner with respect to the sliding of the slide element 16 on the straight section 15*a*, to move only the arm 22, thereby determining the sliding of the hinge 20 within the guide 40 and thus said rotation of the hinge 20 around the hinge 19 and varying said angle of incidence.

By means of such configurations, it is possible to vary the angle of incidence of the leading edge 8 in a simple and, above all, continuous manner, since it is sufficient, having fixed the slide element 16 in a position of the straight section 15*a* (which in the embodiments of FIGS. 2 to 5 corresponds to an end stop 15*b*), to command the sliding of the slide element 18 along the curved section 17*b* or on the straight section 17*c*, both being a continuation of the straight section 17*a*.

In this manner, the resistant load exerted on the moving spoiler 6 is varied, depending on the aerodynamic conditions. It is thus possible to achieve an adaptive control of the movable spoiler 6 which makes it possible to adapt the movable spoiler 6 to different driving conditions.

Conveniently, the first transmission element 13 further includes a third hinge 23 for connecting the movable spoiler 6 (more precisely the leading edge 8) to the body 5 and capable of being arranged, to this end, in a fixed position on the body 5; similarly, the second transmission element 14 further includes a fourth hinge 24 for connecting the movable spoiler 6 (more precisely the trailing edge 10) to the body 5 and capable of being arranged, to this end, in a fixed position on the body 5.

Furthermore, the first transmission element 13 comprises a second arm 25 connecting the hinge 23 to the first arm 21 at a centreline point 21*a* of the first arm 21, so that the sliding of the slide element 16 on the guide element 15 causes a rotation of the centreline point 21*a* around the hinge 23 and a rototranslation of the first arm 21 with respect to the hinge 23; similarly, the second transmission element 14 comprises a second arm 26 connecting the hinge 24 to the first arm 22 at a centreline point 22*a* of the first arm 22, so that the sliding of the slide element 18 on the guide element 17 causes a rotation of the centreline point 22*a* around the hinge 24 and a rototranslation of the first arm 22 with respect to the hinge 24.

In practice, the hinge 23 and the hinge 24 determine a hinged attachment of the movable spoiler 6 to the body 5, i.e. they define respective (fixed) fulcrums, so as to allow a rotation of the second arms 25 and 26 around them, respectively, and the lifting of the movable spoiler 6 from the retracted position to the extracted position (FIG. 4).

In practice, each transmission element 13, 14 defines a linkage to transform the linear movement of the respective slide element 16, 18 commanded by the relative actuator 11, 12 into the movement of the movable spoiler 6.

Preferably, each second arm 25, 26 has a longitudinal extension equal to half the longitudinal extension of the relative first arm 21, 22.

The Applicant has observed that this arrangement, together with the attachment of the second arms 25 and 26 to the centreline points 21*a* and 22*a* of the first arms 21 and 22, determines the best configuration for an optimal distribution of the aerodynamic load acting on the movable spoiler 6 and transmitted to, and supported by, the actuation system. In this manner, the consumption of the actuators 11, 12 is reduced, as less power is necessary to balance the aerodynamic load. This also results in an improved control of the movable spoiler 6.

With reference to FIG. 3, the straight section 15*a* includes an end stop 15*b*.

In some non-limiting cases, the first actuator 11 is configured to command the movable spoiler 6 in the extracted position and to hold the hinge 19 in said fixed position by positioning the slide element 16 at the end stop 15*b*.

In this manner, in the embodiment of FIGS. 2 to 5, the variation of the angle of incidence of the leading edge 8 occurs when the movable spoiler 6 is arranged in the extracted position, thus avoiding an early adjustment of the angle of incidence when the movable spoiler 6 is arranged between the retracted position and the extracted position.

Advantageously but not limitatively, in contrast, the embodiment of FIGS. 10 to 13 also allows adjustments of the angle of incidence of the leading edge 8 at intermediate elevations (heights). In fact, in order to slide the hinge 20 within the guide 40, it is sufficient for there to be a relative movement between the hinge 20 and the hinge 19, which acts as the pivot (of the slotted link mechanism). In this manner, by locking the actuator 11 in an intermediate position of the straight section 15*a*, it is possible to adjust the angle of incidence by moving the actuator 12, which will raise or lower the hinge 20 with respect to the body 5, thus adjusting the tilt of the movable spoiler 6.

Preferably, the first actuator 11 and the second actuator 12 are defined by electric motors.

This type of actuator is less complicated to implement and command than, for example, an actuation of a hydraulic or oleo-hydraulic or pneumatic type.

Advantageously, the first actuator 11 and the second actuator 12 are of an irreversible type, i.e. in the absence of a power supply they are capable of maintaining a reached position (in the present case, the position of the slide elements 16, 18 along their respective guide elements 15, 17).

By means of this arrangement, it becomes possible to use electric motors (which, as specified above, are easier to implement than hydraulic or oleo-hydraulic or pneumatic actuators) while simultaneously avoiding an excessive power consumption to counterbalance the aerodynamic load generated within the airfoil element.

Moreover, an electric motor of this type is particularly useful for the adaptation to the aerodynamic load described above.

It is clear from the foregoing that the movable spoiler assembly 7 provided according to the present invention allows implementing a method of controlling a movable spoiler 6 for a road vehicle 1, the method comprising the steps of:

a) commanding a movement of the movable spoiler 6 between a retracted position, in which the movable spoiler 6 is in a position proximal to the body 5, and an extracted position, in which the movable spoiler 6 is in a position distal to the body 5;

b) tilting the movable spoiler 6 with respect to a longitudinal axis C of the same to vary an angle of incidence of the leading edge 8 with respect to a forward motion direction of the road vehicle 1;

c) providing at least a first actuator 11 of the linear type and comprising a guide element 15, having a straight section 15*a*, and a slide element 16 slidable on the straight section 15*a;* d) providing at least a second actuator 12 of the linear type and comprising a guide element 17, having a straight section 17*a* and a curved section 17*b* or a straight section 17*c* (extension or part of the straight section 17*a*), and a slide element 18 slidable on the straight section 17*a* and on the curved section 17*b* or on the straight section 17*c;* wherein the step a) of commanding is performed at least by sliding the slide element 16 on the respective straight section 15*a;* and wherein the step b) of tilting is performed at least by sliding the slide element 18 on the curved section 17*b* or on the straight section 17*c* in a deferred manner with respect to the sliding of the slide element 16 on the straight section 15*a*.

With reference to FIGS. 6 to 9, the reference number 7' indicates a movable spoiler assembly provided in accordance with a second embodiment of the present invention.

Since the movable spoiler assembly 7' is similar to the movable spoiler assembly 7, only the distinguishing aspects between the two will be described in the following, keeping where possible the same reference numbers for similar or corresponding parts.

In particular, the movable spoiler assembly 7' differs from the movable spoiler assembly 7 in that the second actuator 12 is of a rotary type, has an axis of rotation D and comprises a shaft 27 operable in rotation about the axis D.

In addition, the second transmission element 14 comprises an articulated arm 28, instead of the arm 22 and the arm 26, which connects the shaft 27 with the hinge 20.

The axis D constitutes a fulcrum on the body 5, in said mounted condition. Therefore, the shaft 27 is rotatable in a hinged manner on the body 5 around the axis D.

In other words, the articulated arm 28 is hinged to the body 5, on one side, and to the hinge 20, on the opposite side.

In particular, the articulated arm 28 includes two half-arms 28*a*, 28*b* connected to each other by a fulcrum 28*c*, so as to define a linkage interposed operatively and kinetically between the shaft 27 and the hinge 20, which linkage is designed to transform the rotary movement of the shaft 27 commanded by the second actuator 12 into the movement of the movable spoiler 6.

According to this embodiment, the shaft 27 is rotatably operable to command a displacement of the articulated arm 28, determining the aforementioned rotation of the hinge 20 about the hinge 19 and thereby varying the aforementioned angle of incidence of the leading edge 8.

Advantageously, the movable spoiler assembly 7' comprises:

- a third actuator 29 configured to command the movement of the movable spoiler 6 between the retracted position and the extracted position; and
- a third transmission element 30 connecting the third actuator 29 to the movable spoiler 6 at a hinge 31 arranged near one of either the leading edge 8 or the trailing edge 10, in particular at the leading edge 8.

Figure 6:
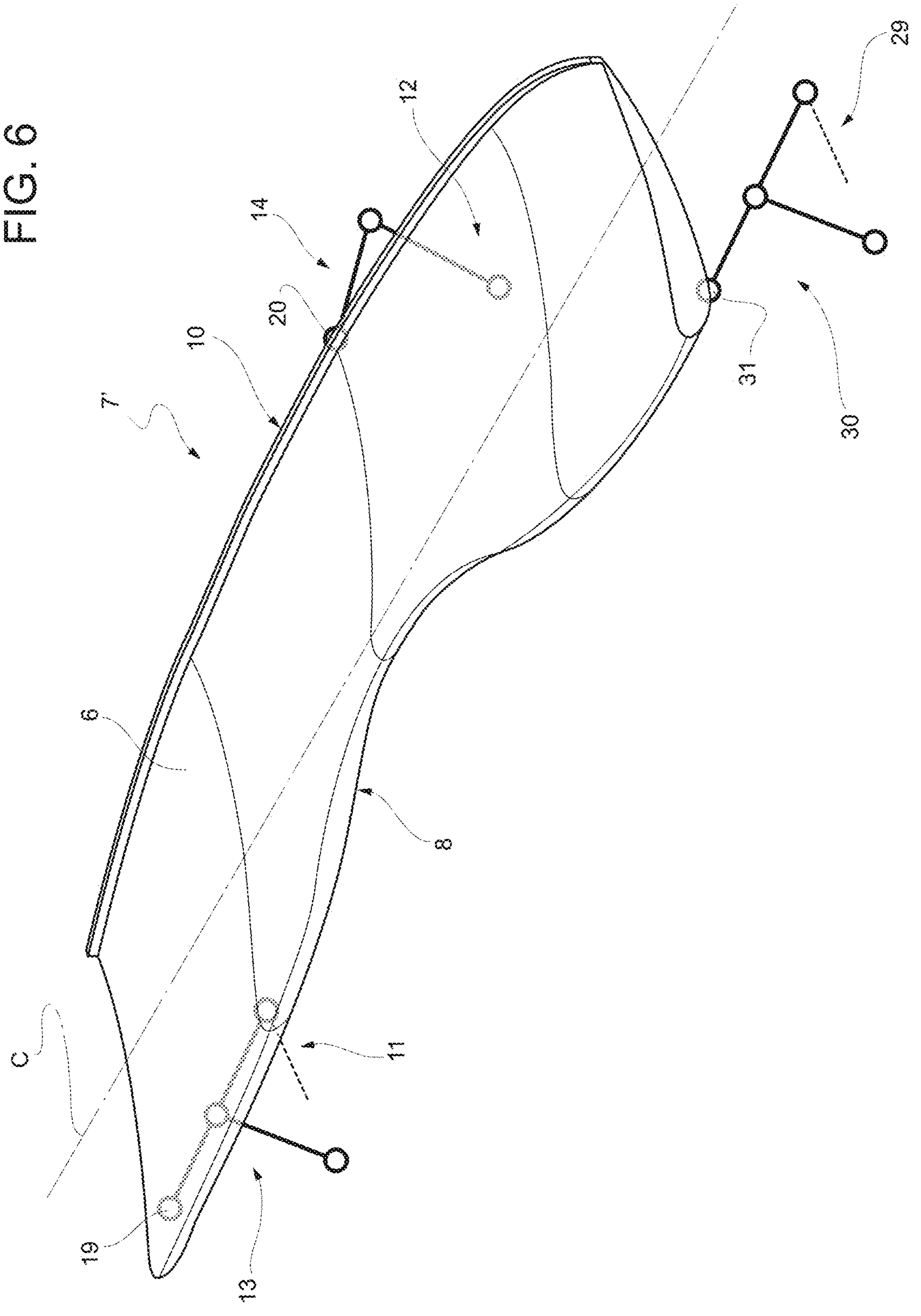
FIG. 6 is a perspective view, on an enlarged scale and with parts removed for clarity, of a movable spoiler assembly of the road vehicle of FIG. 1 provided according to a second embodiment of the present invention.

Conveniently, as illustrated in FIG. 6, the first actuator 11 and the third actuator 29 are arranged at axial end portions of the movable spoiler 6. In particular, the hinge 19 and the hinge 31 are arranged at axial end portions of the leading edge 8, relative to the axis C.

Conveniently, the hinge 20 is interposed between the hinge 19 and the hinge 31, relative to the axial direction with respect to the axis C.

The third actuator 29 is of a linear type, and its structure and operation correspond fully to the structure and operation of the first actuator 11.

Figure 7:
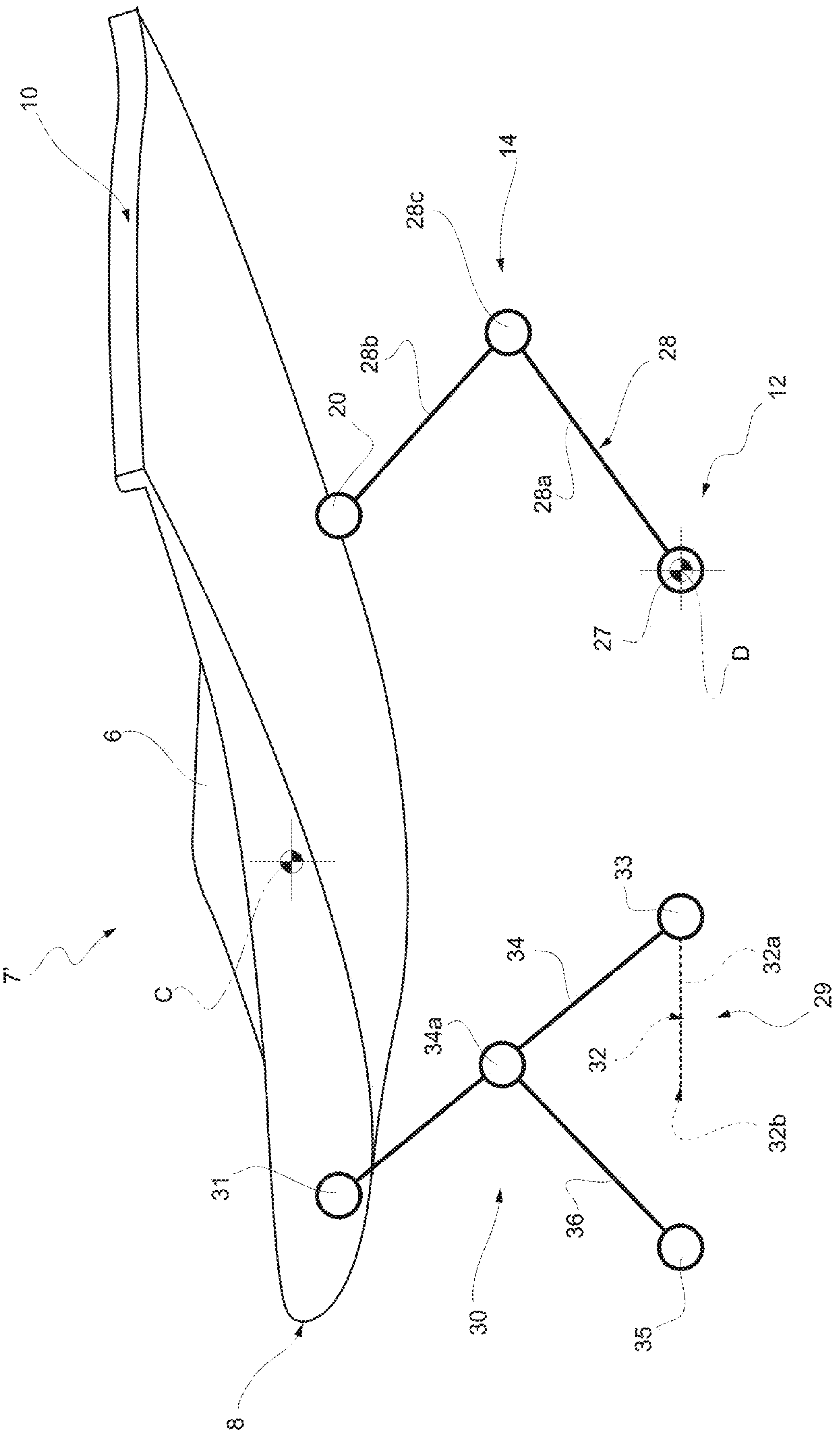
FIGS. 7 to 9 are schematic side views, partially sectioned, on an enlarged scale and with parts removed for clarity, of the movable spoiler assembly of FIG. 6 during three distinct operating conditions.
Figure 8:
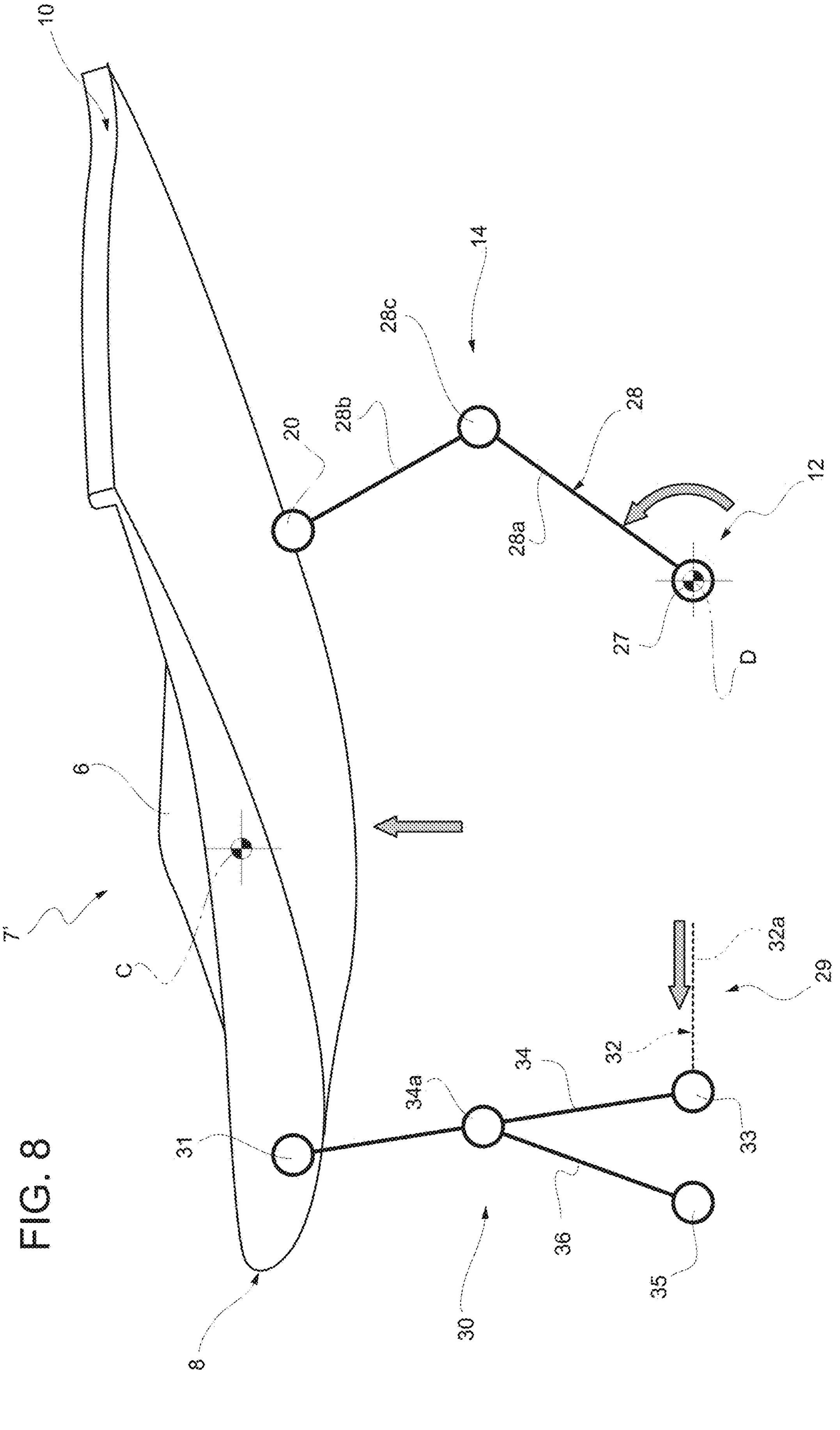
Figure 9:
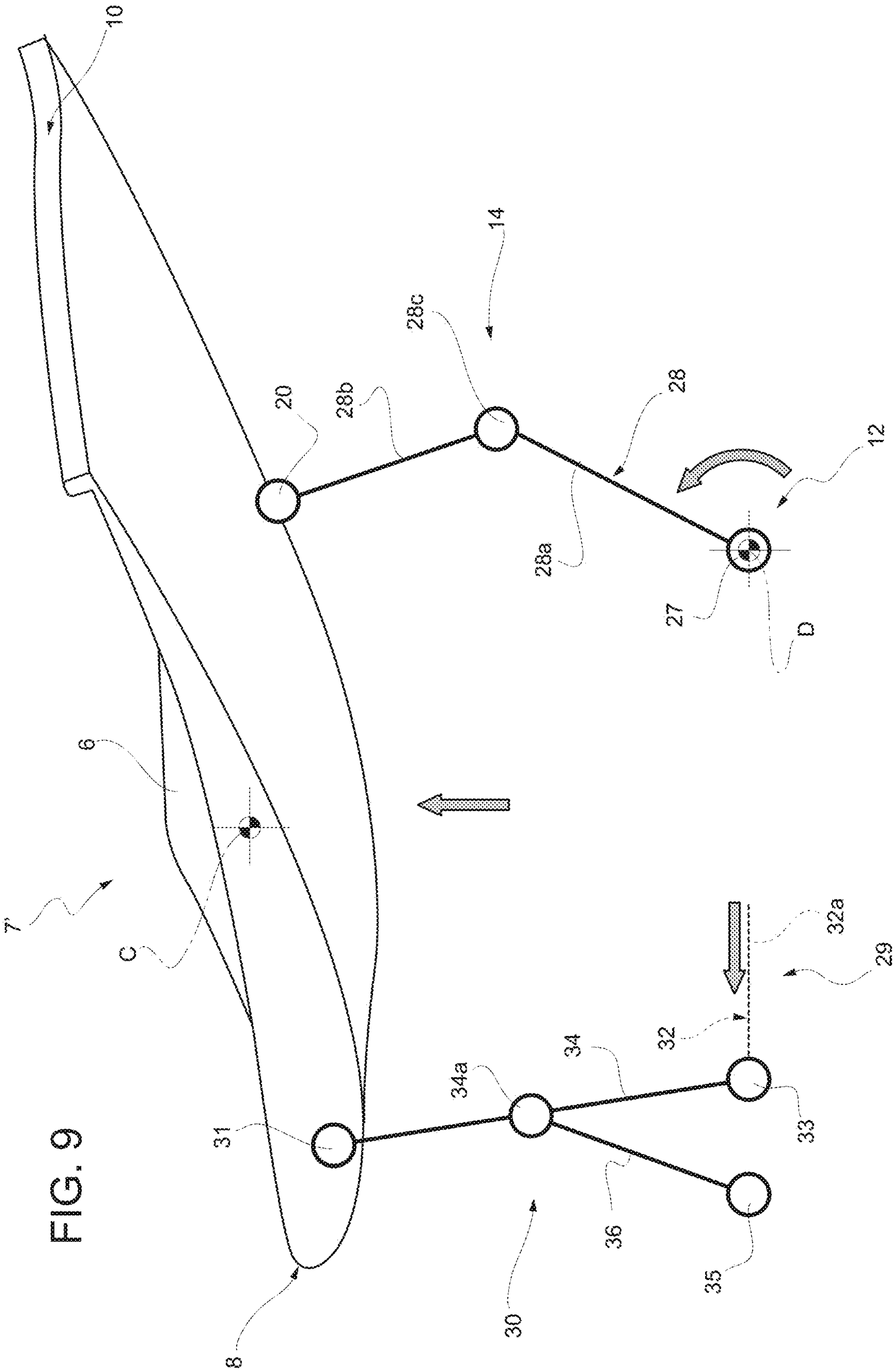
Figure 10:
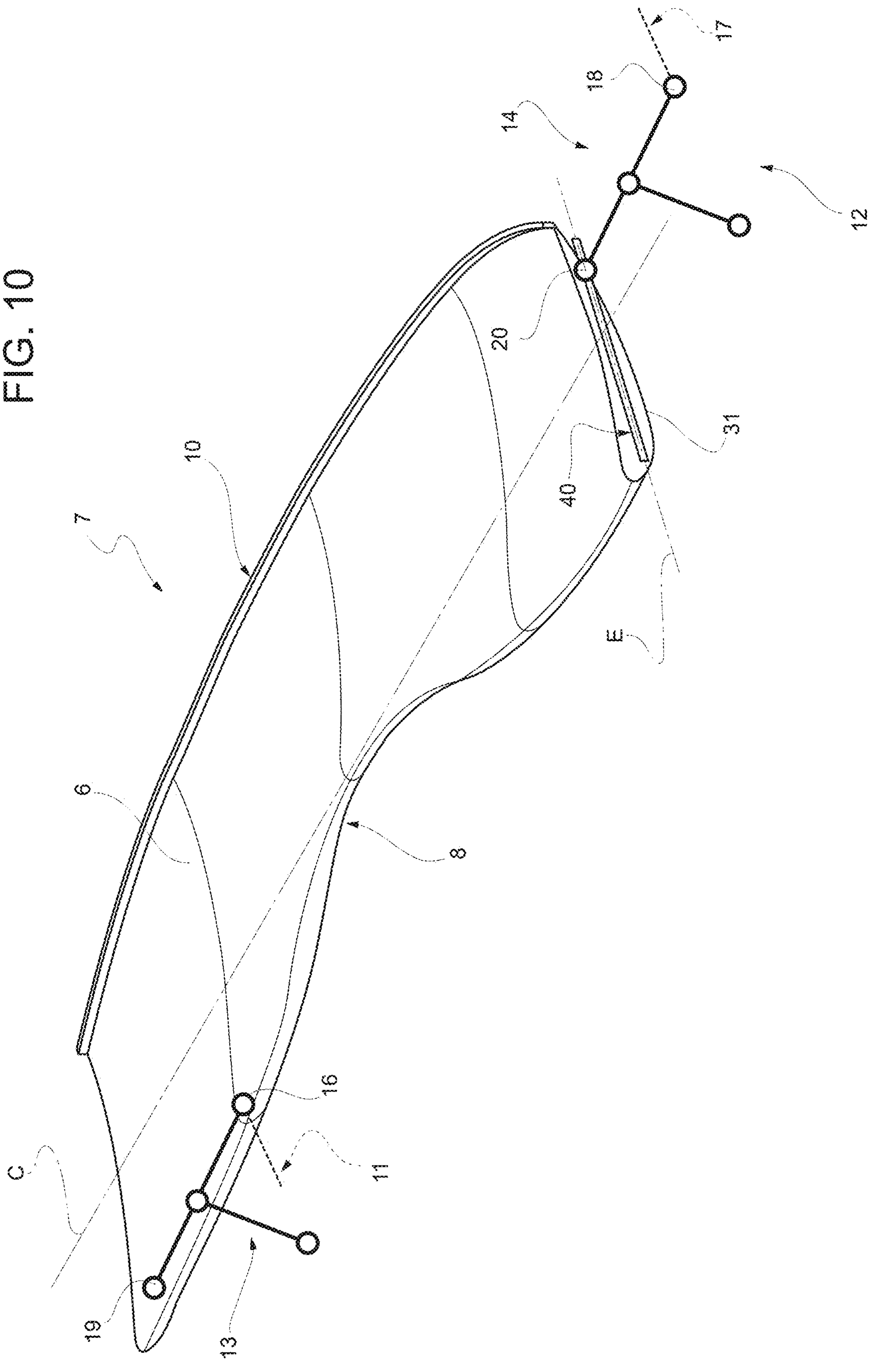
FIG. 10 is a perspective view, on an enlarged scale and with parts removed for clarity, of a movable spoiler assembly of the road vehicle of FIG. 1 provided according to a third embodiment of the present invention.

Consequently, in FIGS. 7 to 9, only one between the first actuator 11 and the third actuator 29 is illustrated.

In detail, the third actuator 29 comprises a guide element 32 having a straight section 32*a* and a slide element 33 slidable on the straight section 32*a*.

The third transmission element 30 comprises an arm 34 connecting the slide element 33 with the hinge 31. More specifically, the third transmission element 30 corresponds entirely to the first transmission element 13 and, thus, includes a hinge 35 hinged to the body 5 in the same way as the hinge 23, and an arm 36 connecting the hinge 35 to a centreline point 34*a* of the arm 34 in the same way as the arm 25.

The slide element 16 and the slide element 33 are simultaneously slidable along the respective straight sections 15*a*, 32*a* to command the movement of the movable spoiler 6 between the retracted position and the extracted position.

Moreover, the shaft 27 is selectively operable in rotation:

- simultaneously with the sliding of the slide element 16 and of the slide element 33, to command the movement of the movable spoiler 6 between the retracted position and the extracted position; or
- in a deferred manner with respect to the sliding of the slide element 16 and of the slide element 33, to command the aforementioned rotation of the hinge 20 around the hinge 19 (and the hinge 31) and thereby vary the aforementioned angle of incidence.

Conveniently, the third actuator 29 is also defined by an electric motor, preferably of an irreversible type.

In other words, the hinge 31 is capable of being held in a fixed position by the third actuator 29, in the same way as the hinge 19 is held in a fixed position by the first actuator 11. At this point, the hinge 20 is rotated relative to the hinges 19 and 31 by rotational actuation of the shaft 27.

By means of this configuration, it is possible to adjust the angle of incidence of the leading edge 8 at any position of the movable spoiler 6 between the retracted position and the extracted position. More precisely, it is not necessary for the slide elements 16, 33 to reach the end stops 15*b*, 32*b* in order to be able to operate the shaft 27 in rotation. This is possible due to the presence of the third actuator 29 and the third transmission element 30, which define a further point of support of the movable spoiler 6 on the body 5.

This results in an adjustment of the movable spoiler assembly 7' even more flexible than the adjustment of the movable spoiler assembly 7 and, thus, in a still further improved aerodynamic adaptability.

It is clear from the foregoing that the movable spoiler assembly 7' provided according to the present invention allows implementing a method of controlling a movable spoiler 6 for a road vehicle 1, the method comprising the steps of:

a) commanding a movement of the movable spoiler 6 between a retracted position, in which the movable spoiler 6 is in a position proximal to the body 5, and an extracted position, in which the movable spoiler 6 is in a position distal to the body 5;

b) tilting the movable spoiler 6 with respect to a longitudinal axis C of the same to vary an angle of incidence of the leading edge 8 with respect to a forward motion direction of the road vehicle 1;

c) providing at least a first actuator 11 of a linear type and comprising a guide element 15, having a straight section 15*a*, and a slide element 16 slidable on the straight section 15*a;* d) providing at least a second actuator 12 of a rotary type, having an axis of rotation D and comprising a shaft 27 operable in rotation about the axis D;

and wherein the step a) of commanding is performed by rotational actuation of the shaft 27 simultaneously with the sliding of the slide element 16 on the straight section 15*a;* and wherein the step b) of tilting is performed by rotational actuation of the shaft 27 in a deferred manner with respect to the sliding of the slide element 16 on the straight section 15*a*.

The advantages that can be achieved with the present invention are evident from an examination of the characteristics of the movable spoiler assembly 7, 7' provided according to the present invention.

In particular, by means of the configurations described above, it is possible to vary the angle of incidence of the leading edge 8 in a simple and, above all, continuous manner, during the driving of the road vehicle 1, since it is sufficient, having fixed the slide element 16 in a position of the straight section 15*a*, to command:

the sliding of the slide element 18 along the curved section 17*b*; or the rotational actuation of the shaft 27.

In this manner, the resistant load exerted on the movable spoiler 6 is varied, depending on the aerodynamic conditions. It is thus possible to define an adaptive control of the movable spoiler 6 that allows adapting the movable spoiler 6 to different driving conditions in a simple and effective manner.

Furthermore, by means of the configurations described above, it is possible to achieve such adaptive control while employing irreversible electric motors, which are easier to implement than hydraulic or oleo-hydraulic or pneumatic actuators.

Although the invention described above makes particular reference to a very precise example embodiment, it is not to be considered limited to this example embodiment, all variants, modifications or simplifications covered by the appended claims falling within its scope.

The movable spoiler assembly and the vehicle described above exhibit numerous advantages.

First of all, they allow an adjustment of the angle of incidence of the movable spoiler, which makes it possible to maximise the downforce at different speeds and thus the performance of said road vehicle.

In addition, by means of the embodiments in FIGS. 6 to 13, it is possible to adjust the incidence of the movable spoiler to different heights, which makes the system even more flexible, whereby it is possible to mount a same assembly on different models and to combine the elevation and tilt of the spoiler to maximise performance or reduce consumption.

Finally, a further advantage of the present invention lies in the mechanical simplicity of the actuation system, which simultaneously allows carrying out all necessary adjustments while keeping electricity consumption low and thereby optimising the environmental and energetic impact of the movable spoiler assembly in the case of a vehicle powered entirely by electric power.

LIST OF REFERENCE NUMBERS IN THE FIGURES

1—road vehicle
2—front part
3—rear part
4—chassis
5—body
6—movable spoiler
7, 7'—movable spoiler assembly
8—leading edge
10—trailing edge
11—first actuator
12—second actuator
13, 14, 30—transmission elements
15, 17, 32—guide elements
16, 18, 33—slide elements
15*a*, 17*a*, 32*a*—straight sections
15*b*, 32*b*—end stops
17*b*—curved section
17*c*—straight section
19, 20, 23, 24, 31, 35—hinges
21, 22, 34—arms
25, 26, 36—arms
27—shaft
28—articulated arm
28*c*—fulcrum
29—third actuator
40—guide
A—road vehicle longitudinal axis
B—road vehicle transverse axis
C—movable spoiler longitudinal axis
D—axis of rotation of shaft 27
E—movable spoiler transverse axis

The invention claimed is:

1. A movable spoiler assembly (7; 7') for a road vehicle (1), the movable spoiler assembly (7; 7') comprising:

a movable spoiler (6) configured to be movably attached to a body (5) of the road vehicle (1) and capable of being moved, in a mounted condition of the movable spoiler assembly (7; 7') on the road vehicle (1), at least between a retracted position, wherein it is arranged in a position proximal to the body (5), and an extracted position, wherein it is arranged in a position distal to the body (5); and an actuation system configured to control the movable spoiler (6) between the retracted position and the extracted position;

the movable spoiler (6) defining an airfoil element having a longitudinal axis (C) and including a leading edge (8) and a trailing edge (10) extending along at least one axial direction;

the actuation system comprising at least two electric actuators (11, 12) to move the movable spoiler (6) and at least two transmission elements (13, 14) to operatively couple each actuator (11, 12) to the movable spoiler (6), respectively;

wherein the at least two electric actuators (11, 12) comprise a first actuator (11) configured to command at least displacement of the movable spoiler (6) between the retracted position and the extracted position, and a second actuator (12) configured to command at least a tilt of the movable spoiler (6) with respect to the longitudinal axis (C), so as to vary an angle of incidence of said leading edge (8), in said mounted condition, relative to a forward motion direction of the road vehicle (1);

wherein the first actuator (11) is of a linear type and comprises a first guide element (15) having a straight section (15*a*) and a slide element (16) slidable on the straight section (15*a*) to command movement of the movable spoiler (6) between the retracted position and the extracted position;

wherein the second actuator (12) is of the linear type and comprises a second guide element (17) having a straight section (17*a*) and a slide element (18) slidable on the straight section (17*a*);

wherein the first guide element (15) and the second guide element (17) are at least partially parallel to each other and are mainly oriented along a direction parallel to a direction of travel of the road vehicle (1);

wherein the at least two transmission elements comprise:

a first transmission element (13) connecting the first actuator (11) to the movable spoiler (6) at a first hinge (19) arranged between the leading edge (8) and the trailing edge (10) at a position relatively closer to one of the leading edge (8) or the trailing edge (10), and a second transmission element (14) connecting the second actuator (12) to the movable spoiler (6) at a second hinge (20) arranged between the leading edge (8) and the trailing edge (10) at a position relatively closer to the other of the leading edge (8) or the trailing edge (10) with respect to the first hinge (19), the first actuator (11) being configured to hold the first hinge (19) in place, and the second actuator (12) being configured to command a rotation of the second hinge (20) around the first hinge (19) held in position, so as to determine said tilt of the movable spoiler (6) and variation of said angle of incidence;

wherein the second hinge (20) is mounted so as to be slidable along a guide (40) arranged on the movable spoiler (6) and extending along a transverse axis (E) of the movable spoiler (6).

2. The movable spoiler assembly (7; 7') according to claim 1, wherein the first transmission element (13) comprises:

a first arm (21) connecting the slide element (16) of the first actuator (11) with the first hinge (19);

a third hinge (23) connecting the movable spoiler (6) to said body (5) and configured to be arranged in a fixed position on said body (5); and a second arm (25) connecting the third hinge (23) to the first arm (21) at a centreline point (21*a*) of the first arm (21), so that the sliding of the slide element (16) on the guide element (15) of the first actuator (11) causes a rotation of the centreline point (21*a*) around the third hinge (23) and a rototranslation of the first arm (21) with respect to the third hinge (23).

3. The movable spoiler assembly (7; 7') according to claim 2, wherein the second arm (25) has a longitudinal extension equal to half the longitudinal extension of the first arm (21).

4. The movable spoiler assembly (7) according to claim 1, wherein the slide element (16) of the first actuator (11) and the slide element (18) of the second actuator (12) are simultaneously slidable along the respective straight sections (15*a*, 17*a*) to control the movement of the movable spoiler (6) between the retracted position and the extracted position;

and wherein the second guide element (17) of the second actuator (12) further comprises a curved section (17*b*) or an additional straight section (17*c*) extending from the respective straight section (17*a*), the slide element (18) of the second actuator (12) being slidable on said curved section (17*b*) or on said additional straight section (17*c*) to control said rotation of the second hinge (20) around the first hinge (19) and vary, thereby, said angle of incidence.

5. The movable spoiler assembly (7) according to claim 4, wherein the straight section (15*a*) of the first guide element (15) and the straight section (17*a*) of the second guide element (17) are parallel to each other; wherein the second guide element (17) is at least as long as the first guide element (15); and wherein the straight section (17*a*) of the first guide element (15) is at least as long as the straight section (15*a*) of the second guide element (17).

6. The movable spoiler assembly (7) according to claim 4, wherein the first transmission element (13) comprises a first arm (21) connecting the slide element (16) of the first actuator (11) with the first hinge (19), wherein the second transmission element (14) comprises a second arm (22) connecting the slide element (18) of the second actuator (12) with the second hinge (20);

wherein the second actuator (12) is selectively operable to command the sliding of the respective slide element (18) on:

the respective straight section (17*a*), simultaneously with the sliding of the slide element (16) of the first actuator (11) on the respective straight section (15*a*), to simultaneously move the first arm (21) and the second arm (22), thereby determining the movement of the movable spoiler (6) between the retracted and the extracted positions; or on said curved section (17*b*) or said additional straight section (17*c*), in a deferred manner with respect to the sliding of the slide element (16) of the first actuator (11) on the respective straight section (15*a*), to move only the second arm (22), thereby determining said rotation of the second hinge (20) around the first hinge (19) and varying said angle of incidence; eventually by the sliding of the second hinge (20) within a guide (40) arranged on the movable spoiler (6) and extending along a transverse axis (E) of the movable spoiler (6).

7. The movable spoiler assembly according to claim 1, wherein the straight section (15*a*) of the slide element (16) of the first actuator (11) includes an end stop (15*b*);

and wherein the first actuator (11) is configured to command the movable spoiler (6) in the extracted position and the holding of the first hinge (19) in position by positioning the slide element (16) of the first actuator (11) at said end stop (15*b*).

8. The movable spoiler assembly (7; 7') according to claim 1, wherein the at least two actuators (11, 12) are defined by electric motors.

9. The movable spoiler assembly (7; 7') according to claim 8, wherein the electric motors are of the irreversible type.

10. A road vehicle (1) comprising:

a vehicular body (5), which defines along its length a longitudinal axis (A) of the road vehicle (1) and along its width a transverse axis (B) of the road vehicle (1); and a movable spoiler assembly (7; 7') according to claim 1;

the movable spoiler assembly (7; 7') being mounted on the body (5) such that the movable spoiler (6) is movably attached to the body (5) with the leading edge (8) and trailing edge (10) transverse to the longitudinal axis (A) of the road vehicle (1);

said longitudinal axis (C) of the movable spoiler (6) being transverse to the longitudinal axis (A) of the road vehicle (1).

11. A method for controlling a movable spoiler (6) of a movable spoiler assembly (7; 7') according to claim 1, the method comprising the steps of:

a) commanding a movement of the movable spoiler (6) between the retracted position, in which the movable spoiler (6) is in the position proximal to the body (5) of the road vehicle (1), and the extracted position, in which the movable spoiler (6) is in the position distal to the body (5);

b) tilting the movable spoiler (6) with respect to the longitudinal axis (C) of the same to vary the angle of incidence of the leading edge (8) with respect to said forward motion direction;

wherein the step a) of commanding is performed at least by sliding the slide element (16) of the first actuator (11) on the respective straight section (15*a*).

12. The method according to claim 11, wherein the second guide element (17) further comprises a curved section (17*b*) or an additional straight section (17*c*), wherein the slide element (18) of the second actuator (12) is selectively slidable on the straight section (17*a*) and on the curved section (17*b*) or the additional straight section (17*c*);

wherein the step a) of commanding is performed by simultaneous sliding of the slide element (16) of the first actuator (11) and the slide element (18) of the second actuator (12) along the respective straight sections (15*a*, 17*a*);

and wherein the step b) of tilting is performed at least by sliding the slide element (18) of the second actuator (12) on the curved section (17*b*) or on the additional straight section (17*c*), in a deferred manner with respect to the sliding of the slide element (16) of the first actuator (11) on the respective straight section (15*a*).

13. A movable spoiler assembly (7; 7') for a road vehicle (1), the movable spoiler assembly (7; 7') comprising:

a movable spoiler (6) configured to be movably attached to a body (5) of the road vehicle (1) and capable of being moved, in a mounted condition of the movable spoiler assembly (7; 7') on the road vehicle (1), at least between a retracted position, wherein it is arranged in a position proximal to the body (5), and an extracted position, wherein it is arranged in a position distal to the body (5); and an actuation system configured to control the movable spoiler (6) between the retracted position and the extracted position;

the movable spoiler (6) defining an airfoil element having a longitudinal axis (C) and including a leading edge (8) and a trailing edge (10) extending along at least one axial direction;

the actuation system comprising at least two electric actuators (11, 12) to move the movable spoiler (6) and at least two transmission elements (13, 14) to operatively couple each actuator (11, 12) to the movable spoiler (6), respectively;

wherein the at least two electric actuators (11, 12) comprise a first actuator (11) configured to command at least displacement of the movable spoiler (6) between the retracted position and the extracted position, and a second actuator (12) configured to command at least a tilt of the movable spoiler (6) with respect to the longitudinal axis (C), so as to vary an angle of incidence of said leading edge (8), in said mounted condition, relative to a forward motion direction of the road vehicle (1);

wherein the first actuator (11) is of a linear type and comprises a first guide element (15) having a straight section (15*a*) and a slide element (16) slidable on the straight section (15*a*) to command movement of the movable spoiler (6) between the retracted position and the extracted position;

wherein the second actuator (12) is of a rotary type, has an axis of rotation (D) and comprises a shaft (27) operable in rotation about the axis of rotation (D);

wherein the first guide element (15) is mainly oriented along a direction parallel to a direction of travel of the road vehicle (1);

wherein the at least two transmission elements comprise:

a first transmission element (13) comprising a first arm (21) connecting the slide element (16) of the first actuator (11) to the movable spoiler (6) at a first hinge (19) arranged between the leading edge (8) and the trailing edge (10) at a position relatively closer to one of the leading edge (8) or the trailing edge (10), and a second transmission element (14) comprising an articulated arm (28) connecting the shaft (27) of the second actuator (12) to the movable spoiler (6) at a second hinge (20) arranged between the leading edge (8) and the trailing edge (10) at a position relatively closer to the other of the leading edge (8) or the trailing edge (10) with respect to the first hinge (19), the first actuator (11) being configured to hold the first hinge (19) in place, and the second actuator (12) being configured to command a rotation of the second hinge (20) around the first hinge (19) held in position, so as to determine said tilt of the movable spoiler (6) and variation of said angle of incidence;

and wherein the shaft (27) is rotatable to command a displacement of the articulated arm (28), determining said rotation of the second hinge (20) about the first hinge (19) and thereby varying said angle of incidence.

14. The movable spoiler assembly (7') according to claim 13, and comprising:

a third actuator (29) configured to command the movement of the movable spoiler (6) between the retracted position and extracted position; and a third transmission element (30) connecting the third actuator (29) to the movable spoiler (6) at a third hinge (31) arranged between the leading edge (8) and the trailing edge (10);

wherein the third actuator (29) is of a linear type and comprises a guide element (32) having a straight section (32*a*) and a slide element (33) slidable on the straight section (32*a*);

wherein the third transmission element (30) comprises a third arm (34) connecting the slide element (33) of the third actuator (29) with the third hinge (31);

wherein the slide element (16) of the first actuator (11) and the slide element (33) of the third actuator (29) are simultaneously slidable along their respective straight sections (15*a*, 32*a*) to command the movement of the movable spoiler (6) between the retracted position and the extracted position, and wherein the shaft (27) is selectively operable in rotation:

simultaneously with the sliding of the slide element (16) of the first actuator (11) and the slide element (33) of the third actuator (29), to command the movement of the movable spoiler (6) between the retracted position and the extracted position; or in a deferred manner with respect to the sliding of the slide element (16) of the first actuator (11) and the slide element (33) of the third actuator (29), to command a rotation of the second hinge (20) around the first hinge (19) and the third hinge (31) and thereby vary said angle of incidence.

15. A method for controlling a movable spoiler (6) of a movable spoiler assembly (7; 7') according to claim 13, the method comprising the steps of:

a) commanding a movement of the movable spoiler (6) between the retracted position, in which the movable spoiler (6) is in the position proximal to the body (5) of the road vehicle (1), and the extracted position, in which the movable spoiler (6) is in the position distal to the body (5);

b) tilting the movable spoiler (6) with respect to the longitudinal axis (C) of the same to vary the angle of incidence of the leading edge (8) with respect to said forward motion direction;

wherein the step a) of commanding is performed at least by rotational actuation of the shaft (27) simultaneously with the sliding of the slide element (16) of the first actuator (11) on the straight section (15*a*);

and wherein the step b) of tilting is performed by rotational actuation of the shaft (27) in a deferred manner with respect to the sliding of the slide element (16) of the first actuator (11) on the straight section (15*a*).

* * * * *